United States Patent
Kesselman et al.

(10) Patent No.: US 8,423,517 B2
(45) Date of Patent: Apr. 16, 2013

(54) SYSTEM AND METHOD FOR DETERMINING THE AGE OF OBJECTS IN THE PRESENCE OF UNRELIABLE CLOCKS

(75) Inventors: Alexander Kesselman, Sunnyvale, CA (US); Alexandre Drobychev, San Jose, CA (US); Daniel J. Ford, East Palo Alto, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/022,551

(22) Filed: Feb. 7, 2011

(65) Prior Publication Data

US 2011/0196901 A1   Aug. 11, 2011

Related U.S. Application Data

(60) Provisional application No. 61/302,894, filed on Feb. 9, 2010.

(51) Int. Cl.
*G06F 17/30* (2006.01)

(52) U.S. Cl.
USPC ........................................................ 707/689

(58) Field of Classification Search .................. 707/689, 707/746, 813
See application file for complete search history.

(56) References Cited

U.S. PATENT DOCUMENTS

| | | | |
|---|---|---|---|
| 6,167,427 A | 12/2000 | Rabinovich et al. | |
| 6,728,751 B1 | 4/2004 | Cato et al. | |
| 6,857,012 B2 | 2/2005 | Sim et al. | |
| 6,883,068 B2 * | 4/2005 | Tsirigotis et al. | 711/133 |
| 7,107,419 B1 | 9/2006 | Ghemawat et al. | |
| 7,251,670 B1 | 7/2007 | Day | |
| 7,293,154 B1 | 11/2007 | Karr et al. | |
| 7,320,059 B1 | 1/2008 | Armangau et al. | |
| 7,450,503 B1 | 11/2008 | Ginjpalli et al. | |
| 7,558,927 B2 | 7/2009 | Clark et al. | |
| 7,567,973 B1 | 7/2009 | Burrows et al. | |
| 7,647,329 B1 | 1/2010 | Fischman et al. | |
| 7,653,668 B1 | 1/2010 | Shelat et al. | |

(Continued)

FOREIGN PATENT DOCUMENTS

EP   1 860 542 A2   11/2007

OTHER PUBLICATIONS

Google Inc., PCT/US2011/024246, Feb. 9, 2011, International Search Report and Written Opinion mailed Apr. 26, 2011, 9 pgs.

(Continued)

*Primary Examiner* — Jorge A Casanova
(74) *Attorney, Agent, or Firm* — Morgan, Lewis & Bockius LLP

(57) ABSTRACT

A system and method for determining an age of an object is provided. A first index for a timestamp entry in a sequence of timestamps corresponding to a time at which an object was created is identified. At least one subsequence of timestamps from the sequence of timestamps having indexes for entries in the sequence of timestamps that are between the first index in the sequence of timestamps and a last index for a last timestamp entry in the sequence of timestamps is identified, wherein the at least one subsequence of timestamps conforms to a function of a time interval between storage of consecutive current timestamps reported by clock of the computer system. Timestamps from the sequence of timestamps that are not included in the at least one subsequence of timestamps are removed. An age of the object is determined based on the at least one subsequence of timestamps.

27 Claims, 18 Drawing Sheets

U.S. PATENT DOCUMENTS

| | | | |
|---|---|---|---|
| 7,660,836 B2 | 2/2010 | Bolik et al. | |
| 7,716,171 B2 | 5/2010 | Kryger | |
| 7,761,678 B1 | 7/2010 | Bodmer et al. | |
| 7,778,972 B1 | 8/2010 | Cormie et al. | |
| 7,778,984 B2 | 8/2010 | Zhang et al. | |
| 7,885,928 B2 | 2/2011 | Harrington et al. | |
| 8,010,514 B2 | 8/2011 | Zhang et al. | |
| 8,099,388 B2 | 1/2012 | Shen et al. | |
| 2002/0147774 A1 | 10/2002 | Lisiecki et al. | |
| 2003/0149709 A1 | 8/2003 | Banks | |
| 2004/0199810 A1 | 10/2004 | Tarcea et al. | |
| 2005/0160078 A1* | 7/2005 | Benson et al. | 707/3 |
| 2005/0198359 A1 | 9/2005 | Basani et al. | |
| 2006/0026219 A1 | 2/2006 | Orenstein et al. | |
| 2006/0112140 A1 | 5/2006 | McBride et al. | |
| 2006/0221190 A1 | 10/2006 | Limberis et al. | |
| 2006/0253498 A1* | 11/2006 | Barrs et al. | 707/200 |
| 2006/0253503 A1* | 11/2006 | Barrs et al. | 707/203 |
| 2007/0050415 A1 | 3/2007 | Armangau et al. | |
| 2007/0078901 A1 | 4/2007 | Satou et al. | |
| 2007/0156842 A1 | 7/2007 | Vermeulen et al. | |
| 2007/0203910 A1 | 8/2007 | Ferguson et al. | |
| 2007/0283017 A1 | 12/2007 | Anand et al. | |
| 2008/0027884 A1 | 1/2008 | Boutault | |
| 2008/0147821 A1 | 6/2008 | Dietrich et al. | |
| 2009/0083342 A1 | 3/2009 | Tomic et al. | |
| 2009/0083563 A1 | 3/2009 | Murase | |
| 2009/0228532 A1 | 9/2009 | Anzai | |
| 2009/0240664 A1 | 9/2009 | Dinker et al. | |
| 2009/0265519 A1 | 10/2009 | Moore et al. | |
| 2009/0271412 A1 | 10/2009 | Lacapra et al. | |
| 2009/0276408 A1 | 11/2009 | Auerbach et al. | |
| 2009/0327602 A1 | 12/2009 | Moore et al. | |
| 2010/0017037 A1 | 1/2010 | Nam et al. | |
| 2010/0094981 A1 | 4/2010 | Cordray et al. | |
| 2010/0138495 A1 | 6/2010 | McIntyre et al. | |
| 2010/0189262 A1 | 7/2010 | Ducharme et al. | |
| 2010/0325476 A1 | 12/2010 | Zhang et al. | |
| 2011/0185013 A1 | 7/2011 | Obata et al. | |
| 2011/0238625 A1 | 9/2011 | Hamaguchi et al. | |

OTHER PUBLICATIONS

Google Inc., PCT/US2011/024247, Feb. 9, 2011, International Search Report and Written Opinion mailed Sep. 23, 2011, 15 pgs.

Google Inc., PCT/US2011/024249, Feb. 9, 2011, International Search Report and Written Opinion mailed Apr. 26, 2011, 10 pgs.

Chang et al., "Bigtable: A Distributed Storage System for Structured Data," OSDI, Oct. 31, 2006, 1-14 pgs.

Ghemawat et al., "The Google File System," SOSP' 03, Oct. 19-22, 2003, 15 pgs.

Google Code, "Protocol Buffers Language Guide," Jul. 11, 2008, 16 pgs. http://code.google.com/apis/protocolbuffers/docs/proto.html.

Korn et al., "The VCDIFF Generic Differencing and Compression Data Format," RFC 3284, Jun. 2002, 1-29 pgs.

Barrett, How Index Building Works, Google Code, Nov. 24, 2008, 3 pgs.

* cited by examiner

Exemplary Server Allocation

| Task / Function | Typical Number of Servers at an Instance |
|---|---|
| 502 — Blobmaster | 10 |
| 504 — Bitpusher | 100 |
| 506 — BigTable Servers | 50 |
| 508 — File System Servers | 1000 |
| 510 — Tape Servers | 10 |
| 512 — Tape Master | 5 |
| 514 — Replication Management | 10 |
| 516 — Quorum Clock Server | 5 |

Figure 5

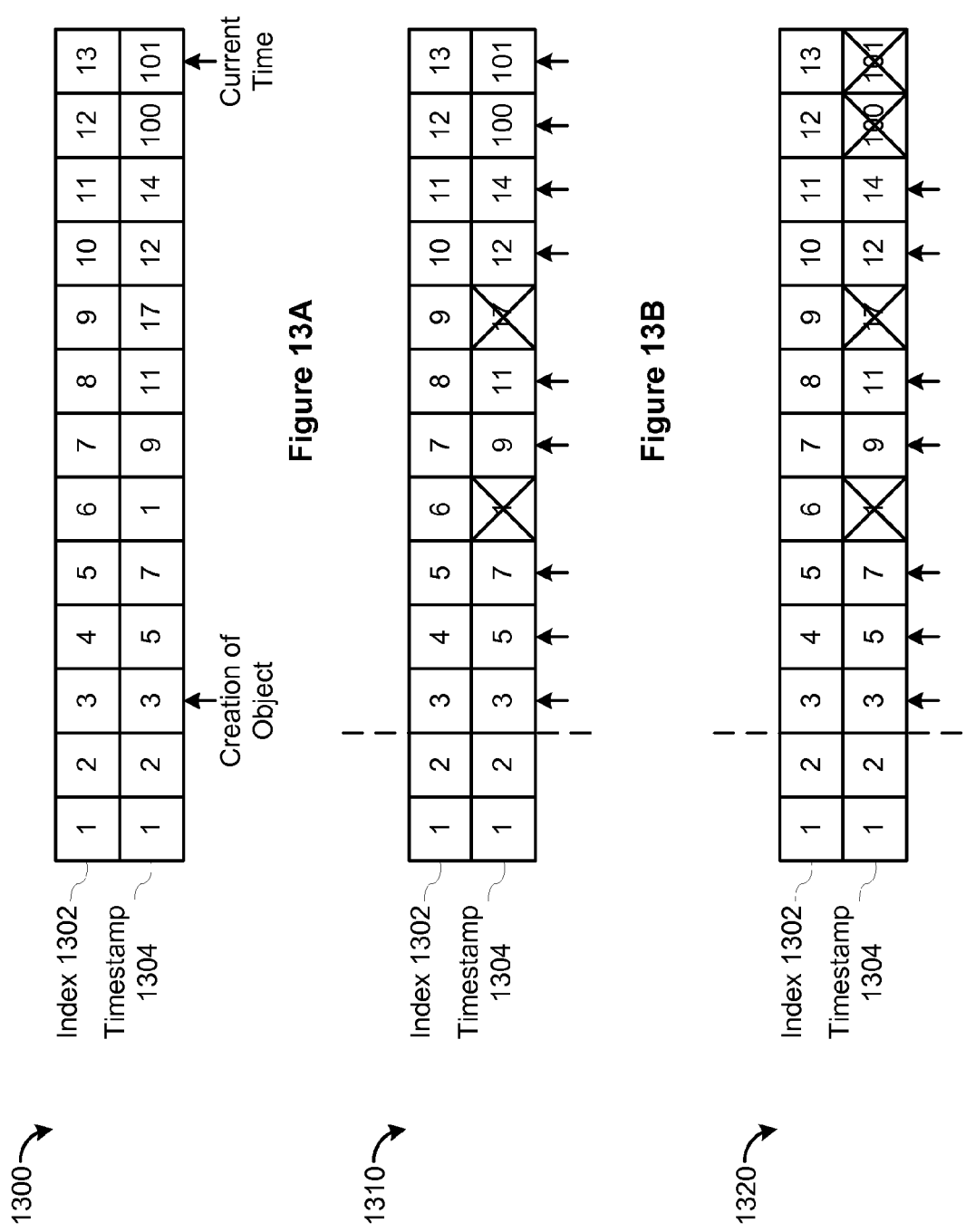

SYSTEM AND METHOD FOR DETERMINING THE AGE OF OBJECTS IN THE PRESENCE OF UNRELIABLE CLOCKS

PRIORITY

This application claims priority to U.S. Provisional Application Ser. No. 61/302,894, filed Feb. 9, 2010, entitled "System and Method for Determining the Age of Objects in the Presence of Unreliable Clocks", which is incorporated by reference herein in its entirety.

TECHNICAL FIELD

The disclosed embodiments relate generally to determining an age of an object. In particular, the disclosed embodiments relate to determining an age of an object in the presence of unreliable clocks.

BACKGROUND

In a large-scale distributed storage system, garbage collectors use garbage collection policies to determine whether objects in the distributed storage system should be removed. For example, a garbage collection policy may specify that objects that are older than M days and that have not been accessed for the past N days should be deleted. The value of M and N is selected so that there is a balance between retaining objects that are still being accessed (or required) by clients and freeing up storage space occupied by unneeded data. The age (or the last access time) of an object is typically determined by saving a creation timestamp corresponding to the time at which the object was created (or a last-access timestamp corresponding to the time at which the last access of the object occurred) and calculating the difference between the current time and the creation timestamp (or the last-access timestamp). This technique works reasonably well if the clock is reliable (i.e., the clock is accurate and the clock skews are bounded in a small range) and if no critical actions (e.g., deleting objects) are taken based on the age of the object. However, if the clock is unreliable (e.g., the clock has large clock skews or is unreliable such that the clock either advances forward in time, backwards in time, or does not advance in time), the calculation of the age (or the last access time) of an object may result in objects being prematurely deleted. Thus, it is desirable to determine the age (or the last access time) of an object in the presence of unreliable clocks.

SUMMARY

To address the aforementioned deficiencies, some embodiments provide a system, a computer-readable storage medium including instructions, and a computer-implemented method for determining an age of an object. A first index for a timestamp entry in a sequence of timestamps corresponding to a time at which an object was created is identified, wherein the sequence of timestamps is generated by periodically storing a current timestamp reported by a clock of the computer system into the sequence of timestamps. At least one subsequence of timestamps from the sequence of timestamps having indexes for entries in the sequence of timestamps that are between the first index in the sequence of timestamps and a last index for a last timestamp entry in the sequence of timestamps is identified, wherein the at least one subsequence of timestamps conforms to a function of a time interval between storage of consecutive current timestamps reported by clock of the computer system. Timestamps from the sequence of timestamps that are not included in the at least one subsequence of timestamps are removed. An age of the object is then determined based on the at least one subsequence of timestamps.

In some embodiments, the at least one subsequence of timestamps from the sequence of timestamps is identified as follows. A longest increasing subsequence of timestamps having indexes for timestamp entries that are between the first index in the sequence of timestamps and the last index for the last timestamp entry in the sequence of timestamps is identified. A plurality of consecutive sequences of timestamps from the longest increasing subsequence of timestamps is then identified, wherein a respective consecutive sequence of timestamps includes at least a predetermined number of timestamps, and wherein the time interval between consecutive timestamps in the respective consecutive sequence of timestamps is less than a predetermined factor of the time interval between storage of consecutive current timestamps reported by the clock of the computer system.

In some embodiments, the age of the object is determined based on the at least one subsequence of timestamps as follows. For each subsequence of timestamps in the at least one subsequence of timestamps, a time interval between a last timestamp in the subsequence of timestamps and a first time stamp in the subsequence of timestamps is calculated. The age of the object is then determined as a sum of the time intervals.

In some embodiments, the age of the object is determined as a time interval between a last timestamp of a last subsequence of timestamps in the at least one subsequence of timestamps and a timestamp in the timestamp entry having the first index in the sequence of timestamps. Note that the last timestamp of the last subsequence is the estimate of the current timestamp.

In some embodiments, a garbage collection operation is performed if the age of the object is greater than a predetermined threshold.

In some embodiments, a garbage collection operation is performed if the age of the object is greater than a predetermined threshold and if metadata is not associated with the object.

In some embodiments, a garbage collection operation is performed if the age of the object is greater than a predetermined threshold and if the object has not been accessed within a predetermined time period.

In some embodiments, the object is stored in a distributed storage system.

In some embodiments, the object is a binary large object (blob).

In some embodiments, clock of the computer system is an unreliable clock.

BRIEF DESCRIPTION OF THE DRAWINGS

FIG. 5 illustrates a typical allocation of instance servers to various programs or processes, according to some embodiments.

FIG. 13A is a block diagram illustrating an exemplary sequence of timestamps, according to some embodiments.

FIG. 13B is a block diagram illustrating an exemplary longest increasing subsequence of timestamps in the sequence of timestamps, according to some embodiments.

FIG. 13C is a block diagram illustrating exemplary subsequences of timestamps in the sequence of timestamps selected from the exemplary longest increasing subsequence of timestamps, according to some embodiments.

Like reference numerals refer to corresponding parts throughout the drawings.

Description Of Embodiments

Before describing techniques for determining an age of an object in the presence of unreliable clocks, it is instructive to present an exemplary system in which these techniques may be used. Note that although the techniques described herein refer to determining an age of an object in the presence of unreliable clocks, it should be understood that these techniques may be used to determine a time interval between two timestamps recorded using an unreliable clock. For example, the techniques described herein may be used to determine the last time an object was accessed.

Distributed Storage System Overview

Figure 1A:
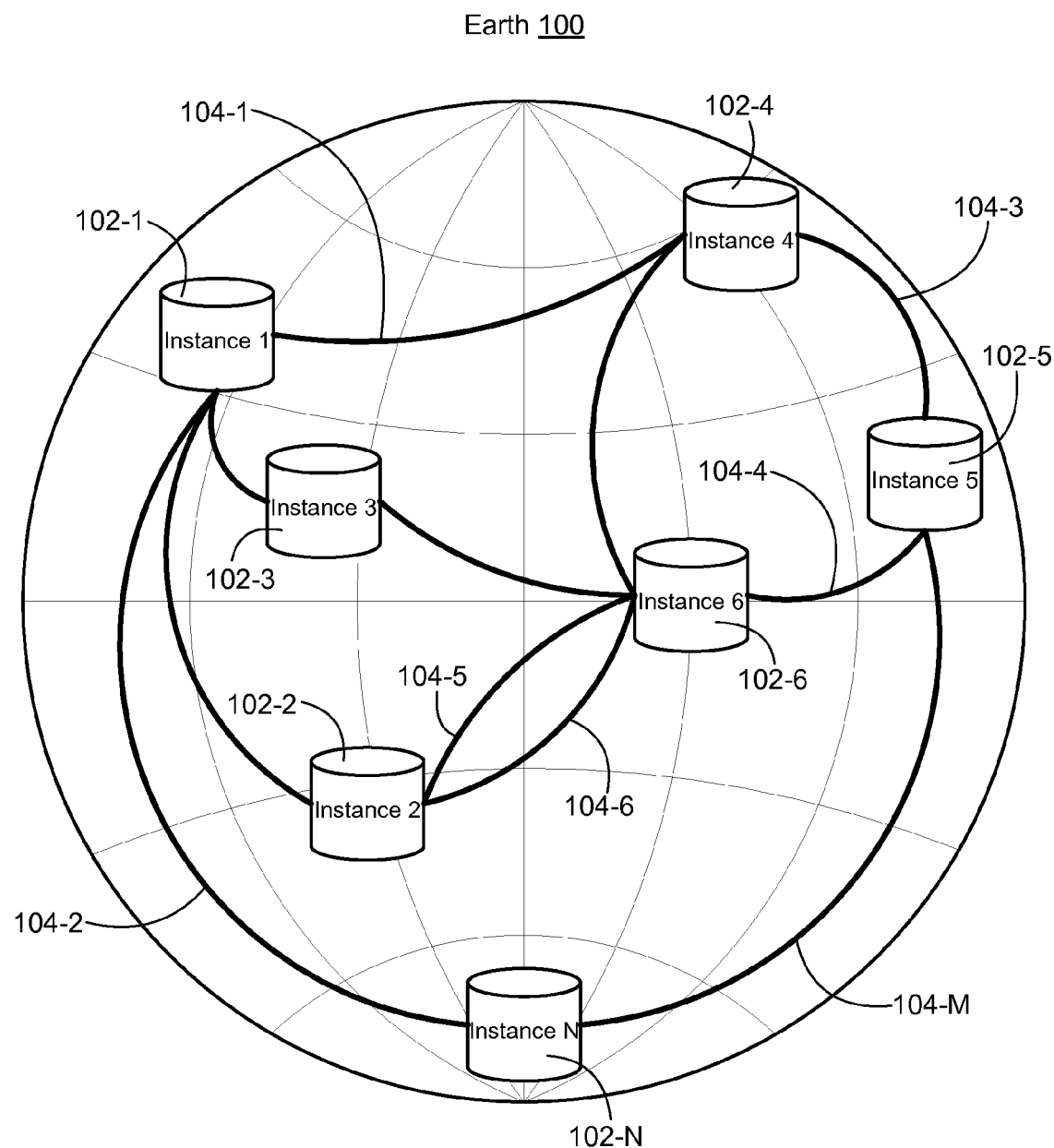
FIG. 1A is a conceptual illustration for placing multiple instances of a database at physical sites all over the globe, according to some embodiments.
Figure 2:
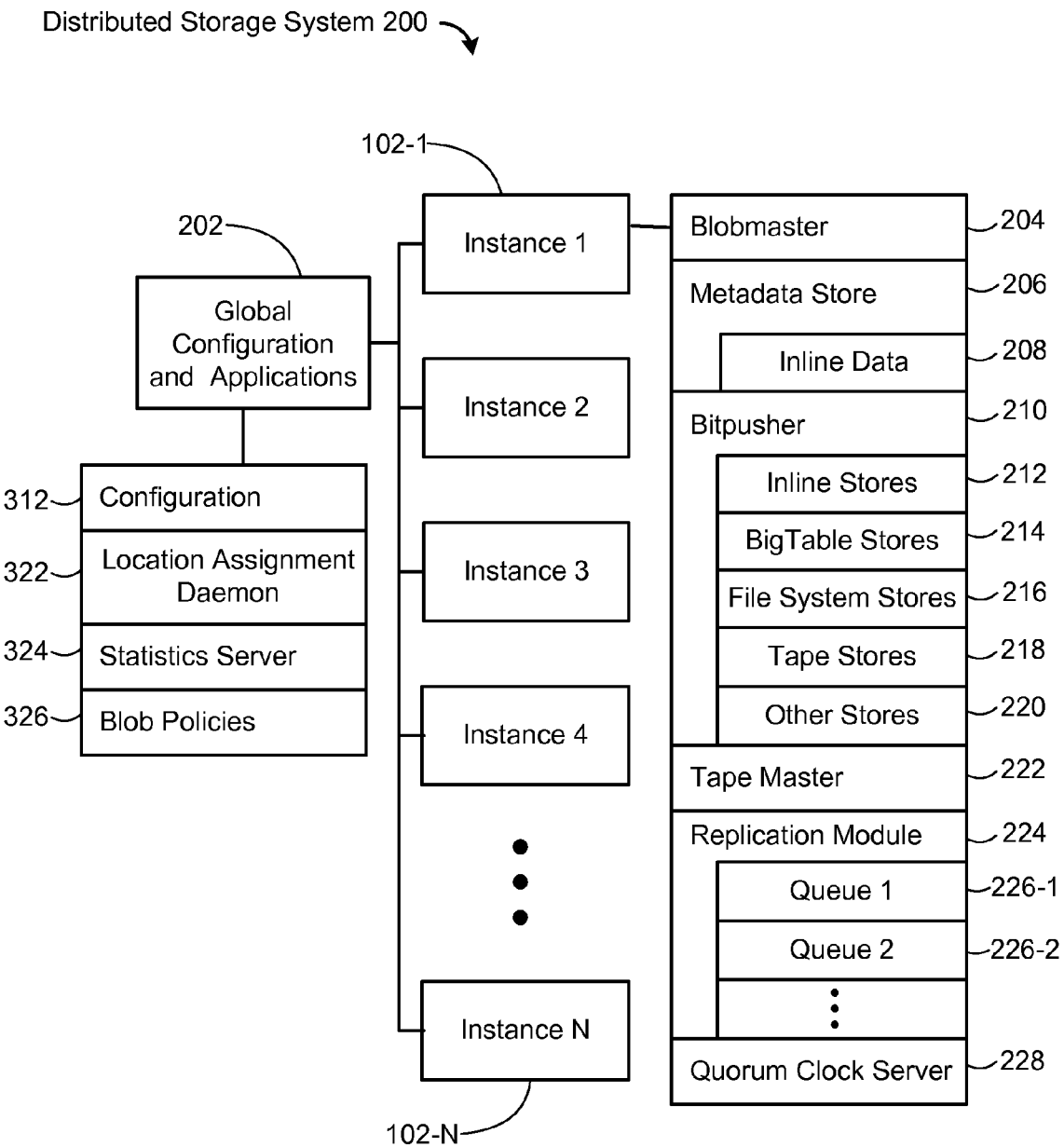
FIG. 2 is a block diagram illustrating multiple instances of a replicated database, with an exemplary set of programs and/or processes shown for the first instance according to some embodiments.
Figure 3:
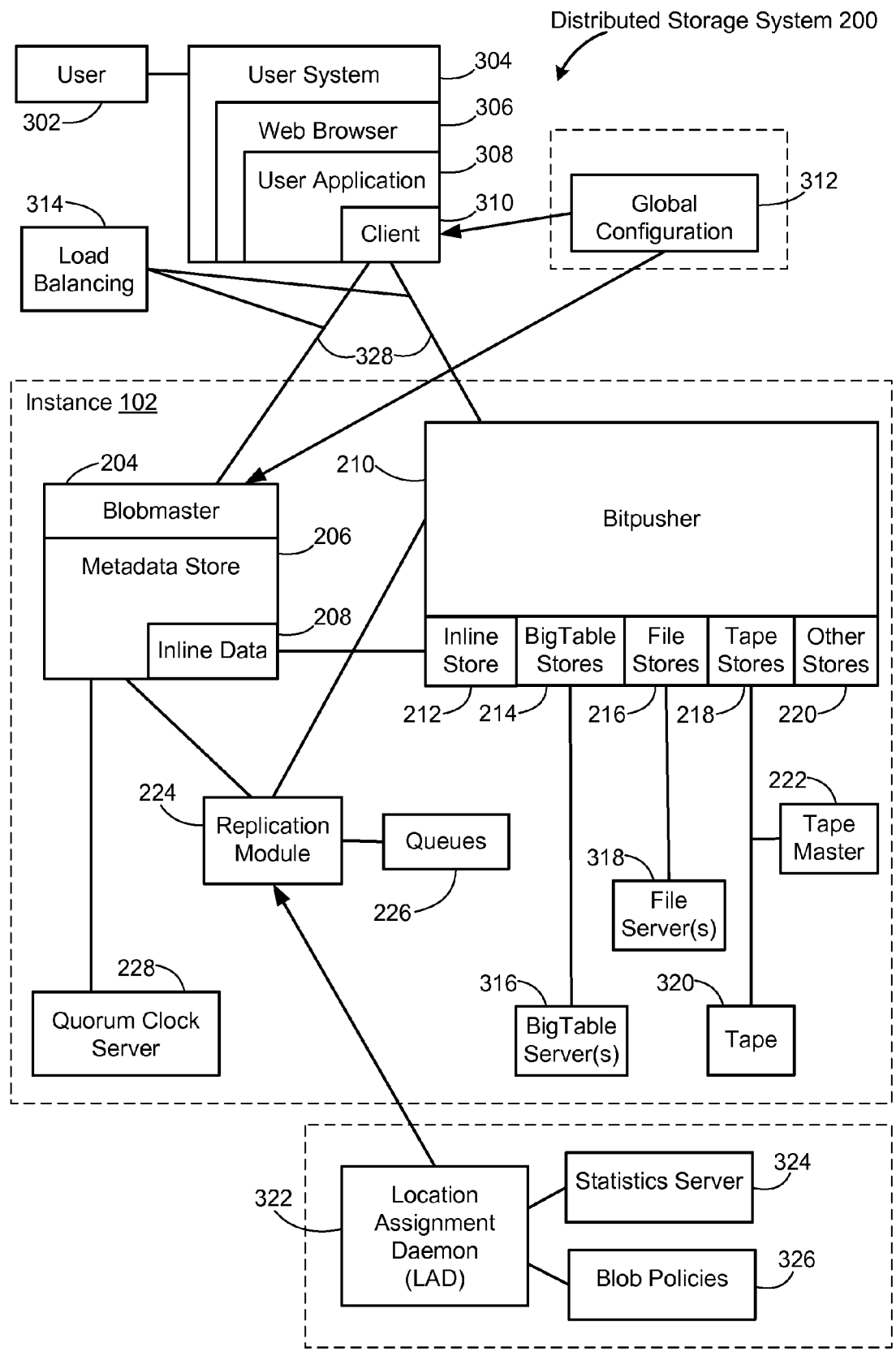
FIG. 3 is a block diagram that illustrates an exemplary instance for the system, and illustrates what blocks within the instance with which a user interacts, according to some embodiments.

The present specification describes a distributed storage system. In some embodiments, as illustrated in FIG. 1A, the distributed storage system is implemented on a global or planet-scale. In these embodiments, there is a plurality of instances 102-1, 102-2, ... 102-N at various locations on the Earth 100, connected by network communication links 104-1, 104-2, ... 104-M. In some embodiments, an instance (such as instance 102-1) corresponds to a data center. In other embodiments, multiple instances are physically located at the same data center. Although the conceptual diagram of FIG. 1A shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
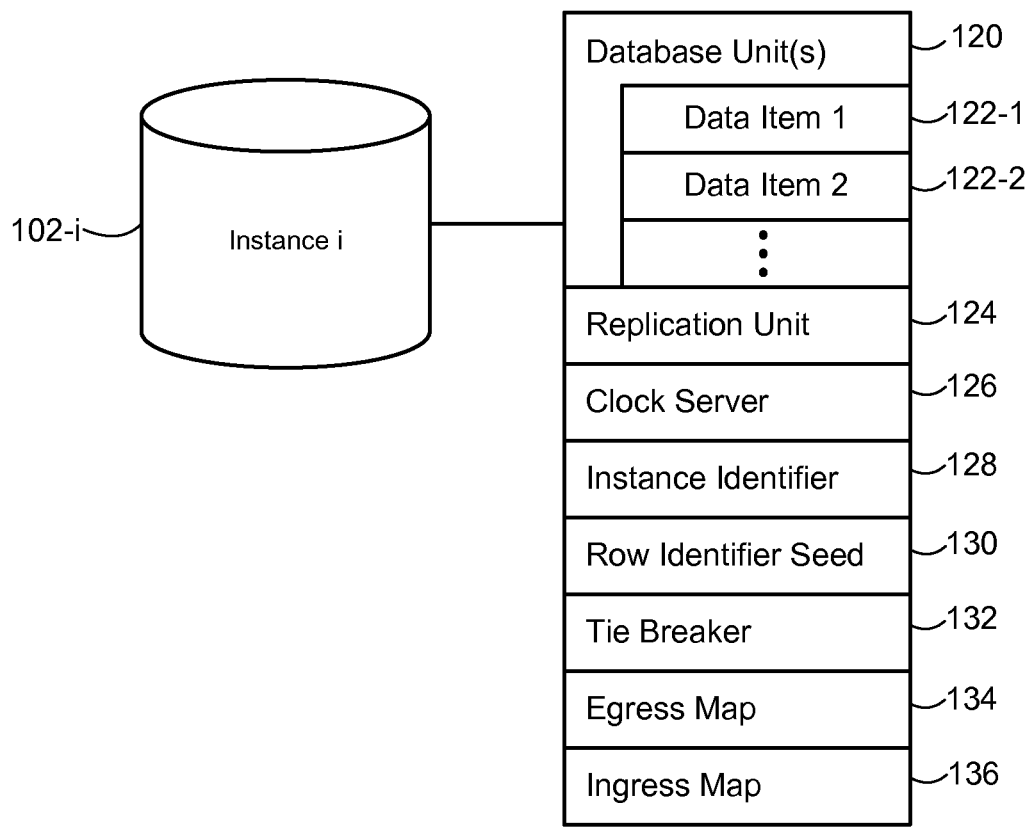
FIG. 1B illustrates basic functionality at each instance according to some embodiments.

FIG. 1B illustrates data and programs at an instance 102-$i$ that store and replicate data between instances. The underlying data items 122-1, 122-2, etc. are stored and managed by one or more database units 120. Each instance 102-$i$ has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances. Egress maps and ingress maps are described in more detail with respect to FIGS. 14A-14D, 15A, and 17 of co-pending U.S. patent application Ser. No. 12/703,167, "Method and System for Efficiently Replicating Data in Non-Relational Databases," filed Feb. 9, 2010, which is incorporated herein by reference in its entirety.

Each instance 102-$i$ has one or more clock servers 126 that provide accurate time. In some embodiments, the clock servers 126 provide time as the number of microseconds past a well-defined point in the past. In some embodiments, the clock servers provide time readings that are guaranteed to be monotonically increasing. In some embodiments, each instance server 102-$i$ stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-$i$ stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described with respect to FIG. 6-9 of co-pending U.S. patent application Ser. No. 12/703, 167, "Method and System for Efficiently Replicating Data in Non-Relational Databases," filed Feb. 9, 2010, which is incorporated herein by reference in its entirety. In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

In some embodiments the disclosed distributed storage system 200, the distributed storage system is used by one or more user applications 308, which are provided by application servers, such as 150-1, 150-2, 150-3, 150-4, and 150-5 illustrated in FIGS. 1C-1G. Exemplary user applications that use embodiments of the disclosed distributed storage system include Gmail, YouTube, Orkut, Google Docs, and Picassa. Some embodiments of the disclosed distributed storage system simultaneously provide storage for multiple distinct user applications, and impose no limit on the number of distinct user applications that can use the distributed storage system. For example, a single implementation of the disclosed distributed storage system may provide storage services for all of the exemplary user applications listed above. In some embodiments, a user application 308 runs in a web browser 306, on a user computer system 304. A user 302 interacts with a user application 308 according to the interface provided by the user application. Each user application 308 uses a client library 310 to store and retrieve data from the distributed storage system 200.

Figure 1C:
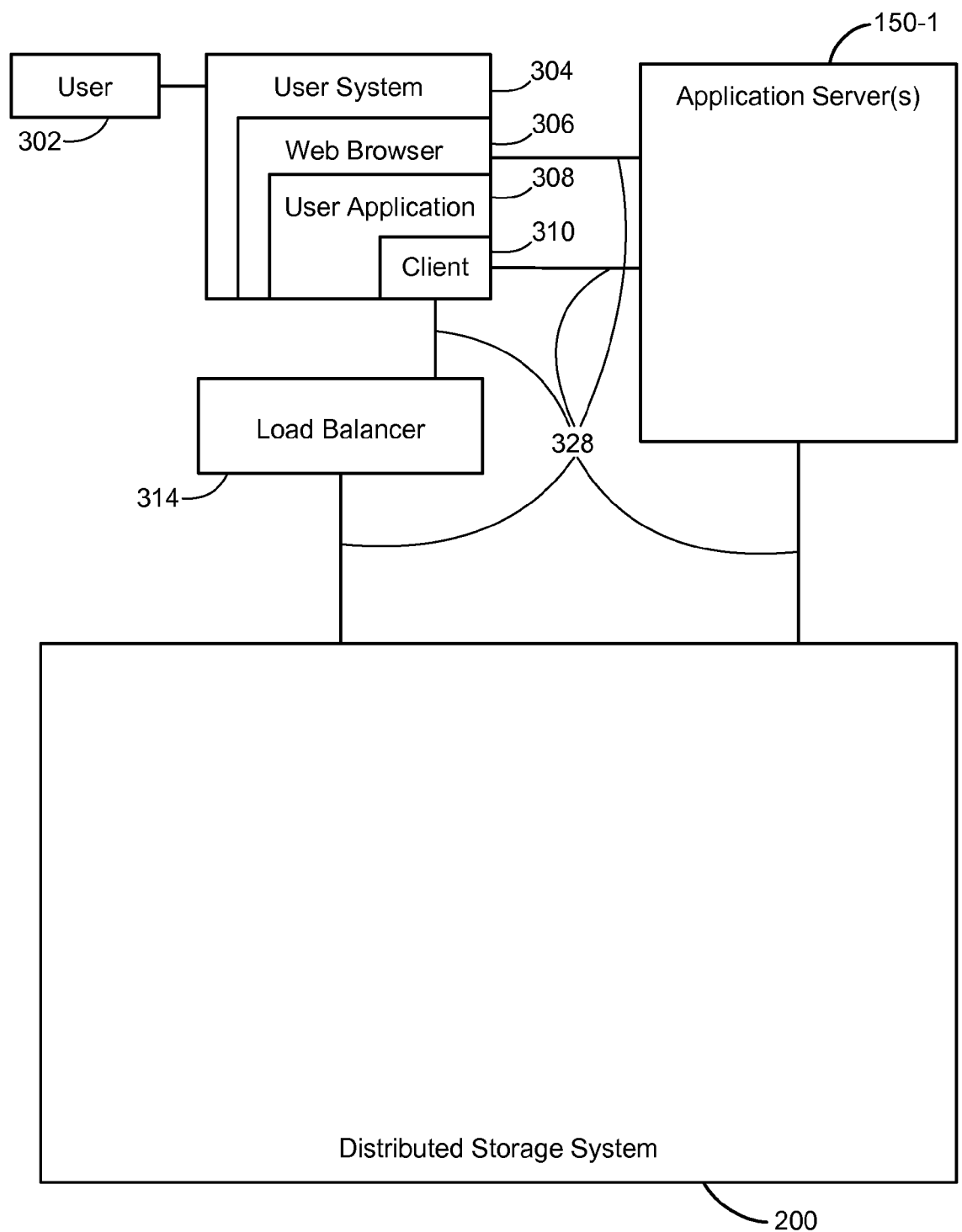
FIGS. 1C-1G illustrate ways that a distributed storage system may be integrated with systems that provide user applications according to some embodiments.

FIG. 1C illustrates an embodiment in which a user application is provided by one or more application servers 150-1. In some embodiments, the web browser 306 downloads user application 308 over a network 328 from the application servers 150-1. In addition to communication between the application server 150-1 and the user system 304, the application server(s) 150-1 communicate over network 328 with the distributed storage system 200. In particular, the application servers may establish storage policies 326 that are applicable to all data stored by the supplied user application. For example, administrators of the Gmail Application servers may establish storage policies 326 that are applicable to millions of user of Gmail.

In some embodiments, communication between the client library 310 and the distributed storage system utilizes a load balancer 314, which can distribute user requests to various instances within the distributed storage system based on various conditions, such as network traffic and usage levels at each instance. In the embodiment illustrated in FIG. 1C, the load balancer 314 is not an integrated component of the distributed storage system 200. The load balancer 314 communicates with both the client library 310 and the distributed storage system 200 over one or more networks 328. The network 328 may include the Internet, one or more local area networks (LANs), one or more wide are networks (WANs), one or more wireless networks (WiFi networks), or various combinations of these.

Figure 1D:
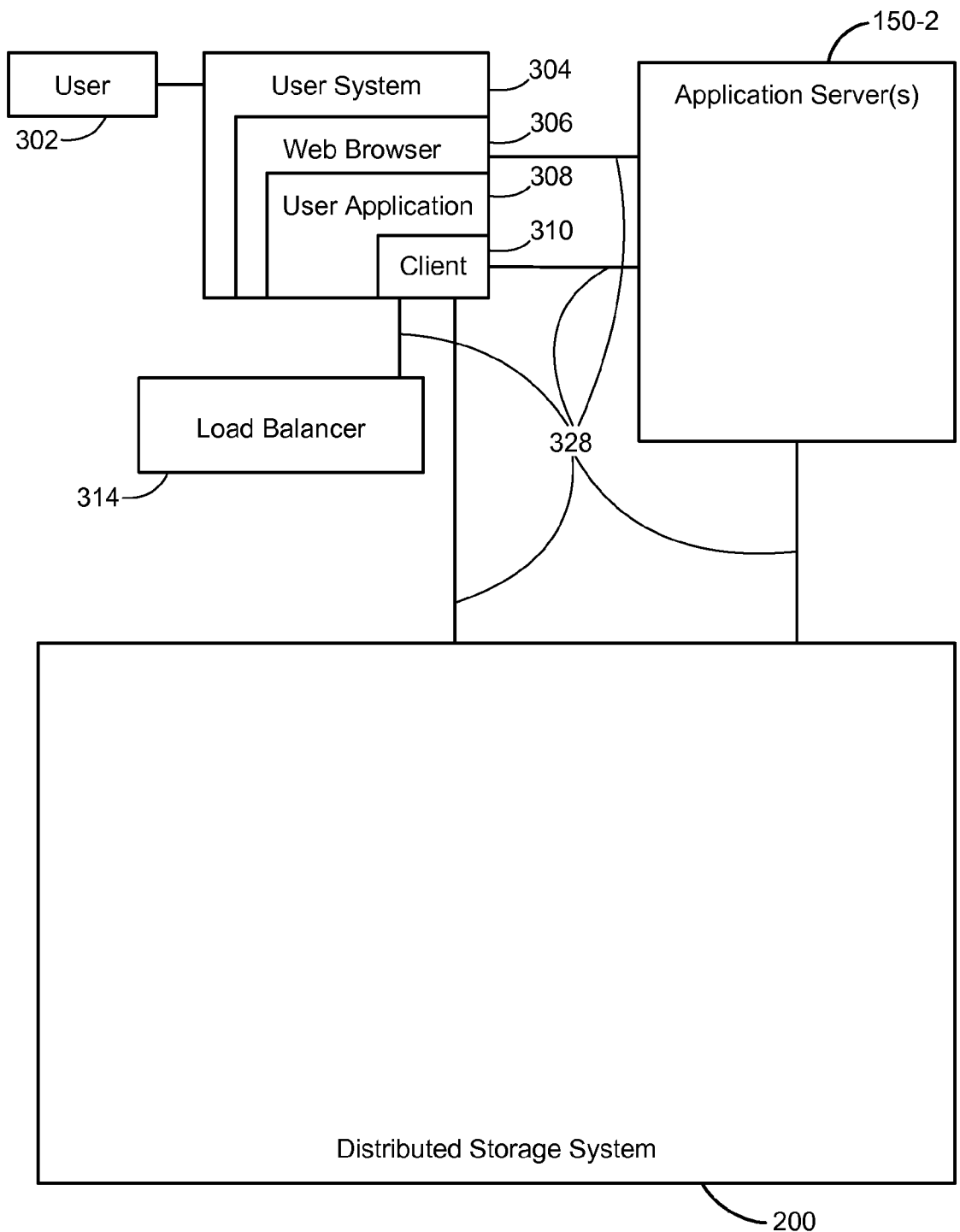

FIG. 1D illustrates an embodiment that is similar to FIG. 1C, except that the load balancing system 314 just returns information to the client library 310 to specify which instance 102 within the distributed storage system 200 should be contacted. The client library 310 then contacts the appropriate instance 102 directly.

Figure 1E:
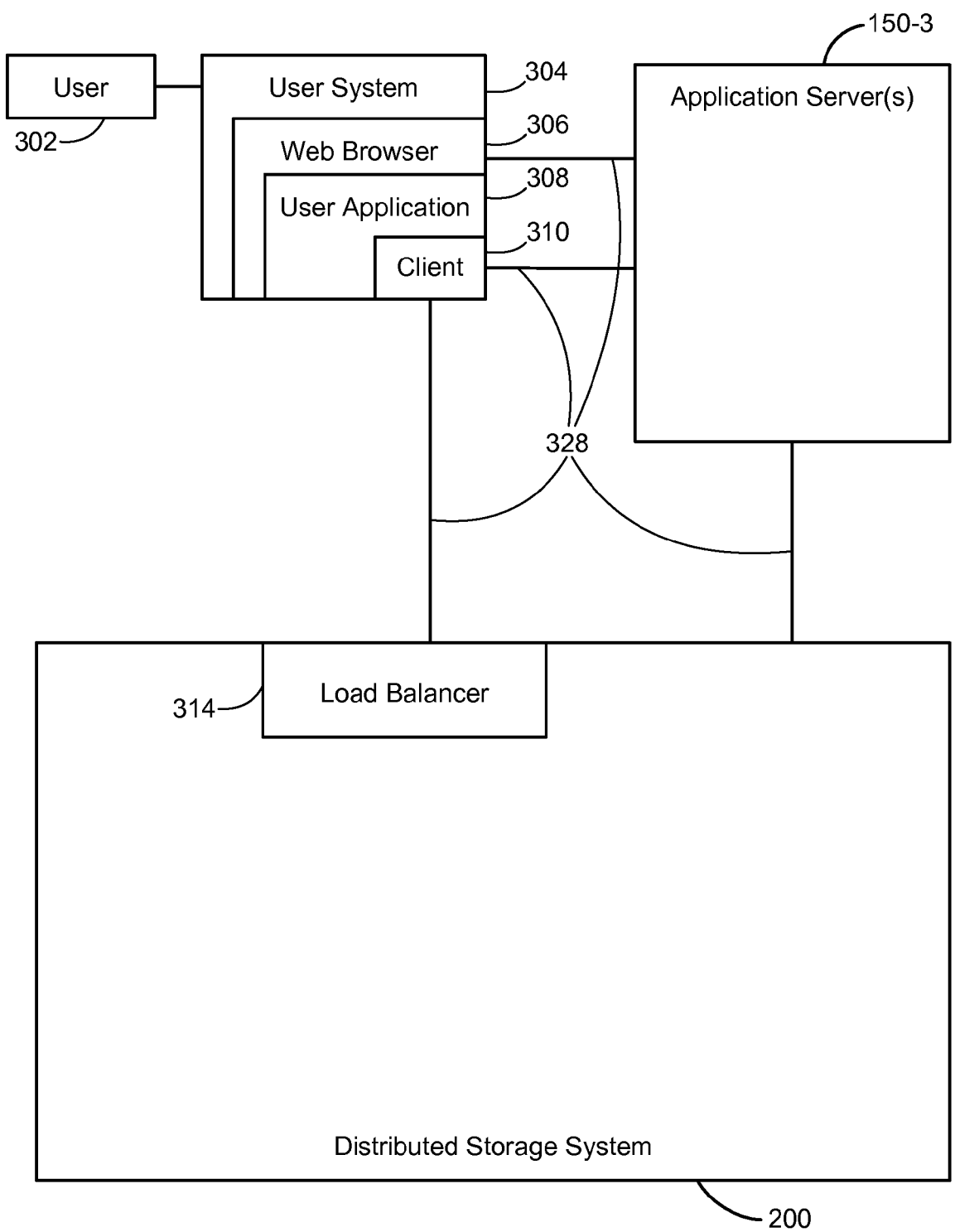

FIG. 1E illustrates an embodiment that is similar to FIG. 1C, except that the load balancing system 314 is an integrated part of the distributed storage application 200. In some embodiments, load balancers 314 are included at some or all of the instances within the distributed storage system 200. Even in these embodiments, a load balancer 314 may direct the communication to a different instance.

Figure 1F:
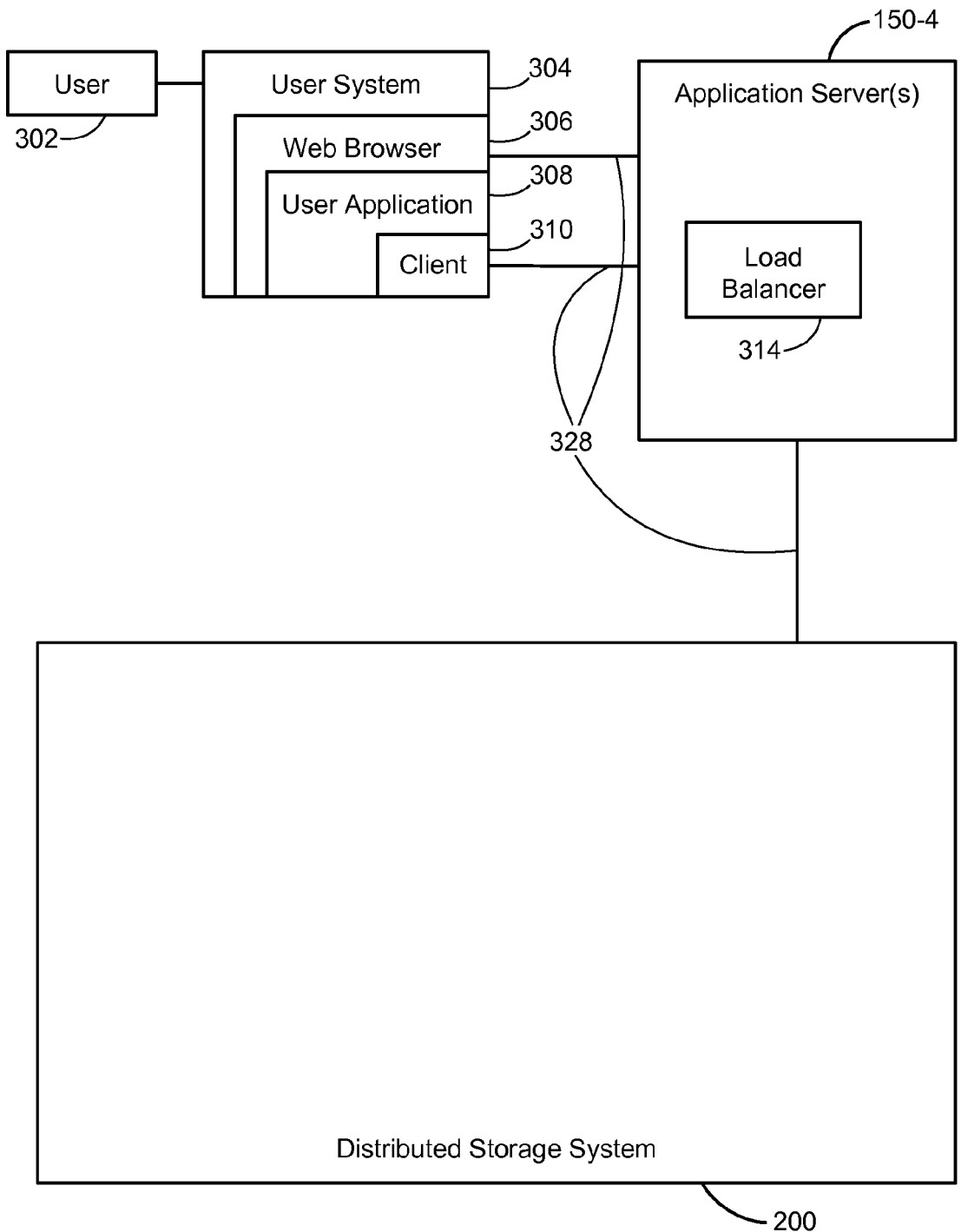

FIG. 1F illustrates an embodiment that is similar to FIG. 1C, except that the load balancing service 314 is included in the application servers 150-4. This embodiment is more commonly used when the distributed storage system 200 is being used by a single user application provided by the application servers 150-4. In this case, the load balancer 314 has a complete picture of the load because the application servers 150-4 receive all of the traffic directed to the distributed storage system.

Figure 1G:
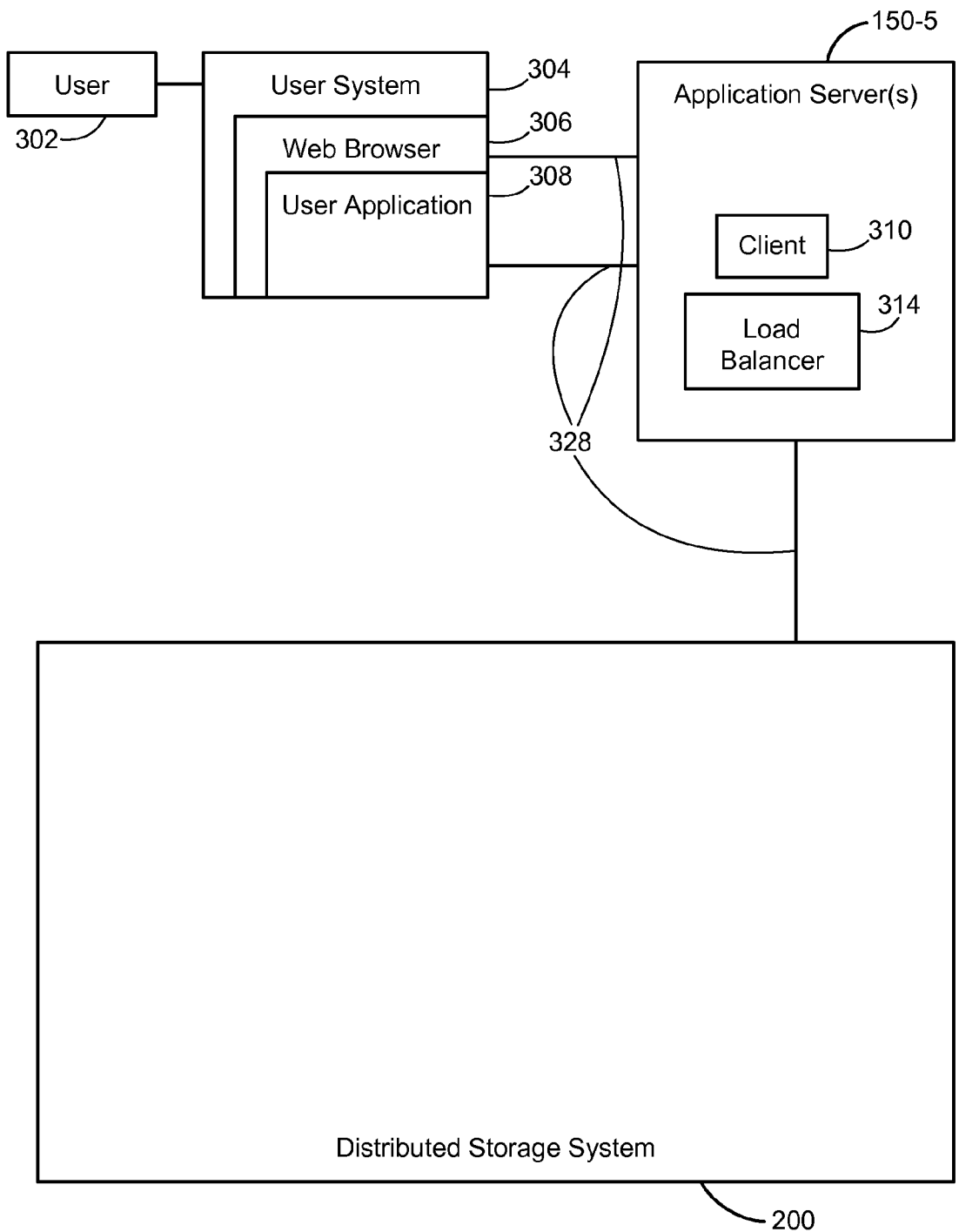

FIG. 1G illustrates a variation of FIG. 1F, in which the client library 310 is maintained at the application servers 150-5 rather than integrated within the running user application 308.

The distributed storage system 200 shown in FIGS. 2 and 3 includes certain global applications and configuration information 202, as well as a plurality of instances 102-1, . . . 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned objects. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob. The metadata table 206 is described in greater detail in co-pending U.S. patent application Ser. No. 12/703,167, "Method and System for Efficiently Replicating Data in Non-Relational Databases," filed Feb. 9, 2010, which is incorporated herein by reference in their entirety.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. The communication between the client 310 and bitpushers is also subject to load balancing 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blobs identifies which instances have copies of the desired blob, so the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are solely on chunks. In some of these embodiments, a bitpusher deals only with chunks, and has no knowledge of blobs. In some embodiments, a bitpusher has no knowledge of the contents of the data that is read or written, and does not attempt to interpret the contents. Embodiments of a bitpusher 210 support one or more types of data store. In some embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In some embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In some embodiments, the file system is distributed across many individual servers 318 to reduce risk of loss or unavailability of any individual computer.

Tape stores 218 store data on physical tapes 320. Unlike a tape backup, the tapes here are another form of storage. The tape stores 218 are described in greater detail in co-pending U.S. Provisional Patent Application No. 61/302,909, Filed Feb. 9, 2009, subsequently filed as U.S. patent application Ser. No. 13/023,498, filed Feb. 8, 2011, "Method and System for Providing Efficient Access to a Tape Storage System, "which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution. It is important to note that even if the quorum clock server 228 determines that the independent clocks are consistent with each other (or with a subset of each other), the independent clocks may still be unreliable. For example, it is possible the independent clocks are skewed in the same direction (e.g., skewed to the future or past). Thus, calculating time intervals using times reported by the quorum clock server 228 may still produce incorrect behavior. The embodiments described below may be used to determine time intervals between two times reported by an unreliable clock (e.g., the clock generated by the quorum clock server 228).

In some embodiments, each instance has a replication module 224, which identifies blobs or chunks that will be replicated to other instances. In some embodiments, the replication module 224 may use one or more replication queues 226-1, 226-2, . . . Items to be replicated are placed in a replication queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. Provisional Patent Application No. 61/302,896, filed Feb. 9, 2010, subsequently filed as U.S. patent application 13/022,579, filed February 7, 2011, "Method and System for Dynamically Replicating Data within a Distributed Storage System,"which is incorporated herein by reference in its entirety.

In some embodiments, a background replication process creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226. The use of blob policies 326 and the operation of a location assignment daemon 322 are described in more detail in co-pending U.S. Provisional Patent Application No. 61/302,936, Filed Feb. 9, 2010, subsequently filed as U.S. patent application 13/022,290, filed Feb. 7, 2011, "System and Method for Managing Replicas of Objects in a Distributed Storage System," which is incorporated herein by reference in its entirety. The replication queues 226 are described in more detail in co-pending U.S. Provisional Patent Application No. 61/302,908, filed Feb. 9, 2010, subsequently filed as U.S. patent application Ser. No. 13/022,564, filed Feb. 7, 2011, "System and Method for Replicating Objects in a Distributed Storage System," which is incorporated herein by reference in its entirety.

Figure 4:
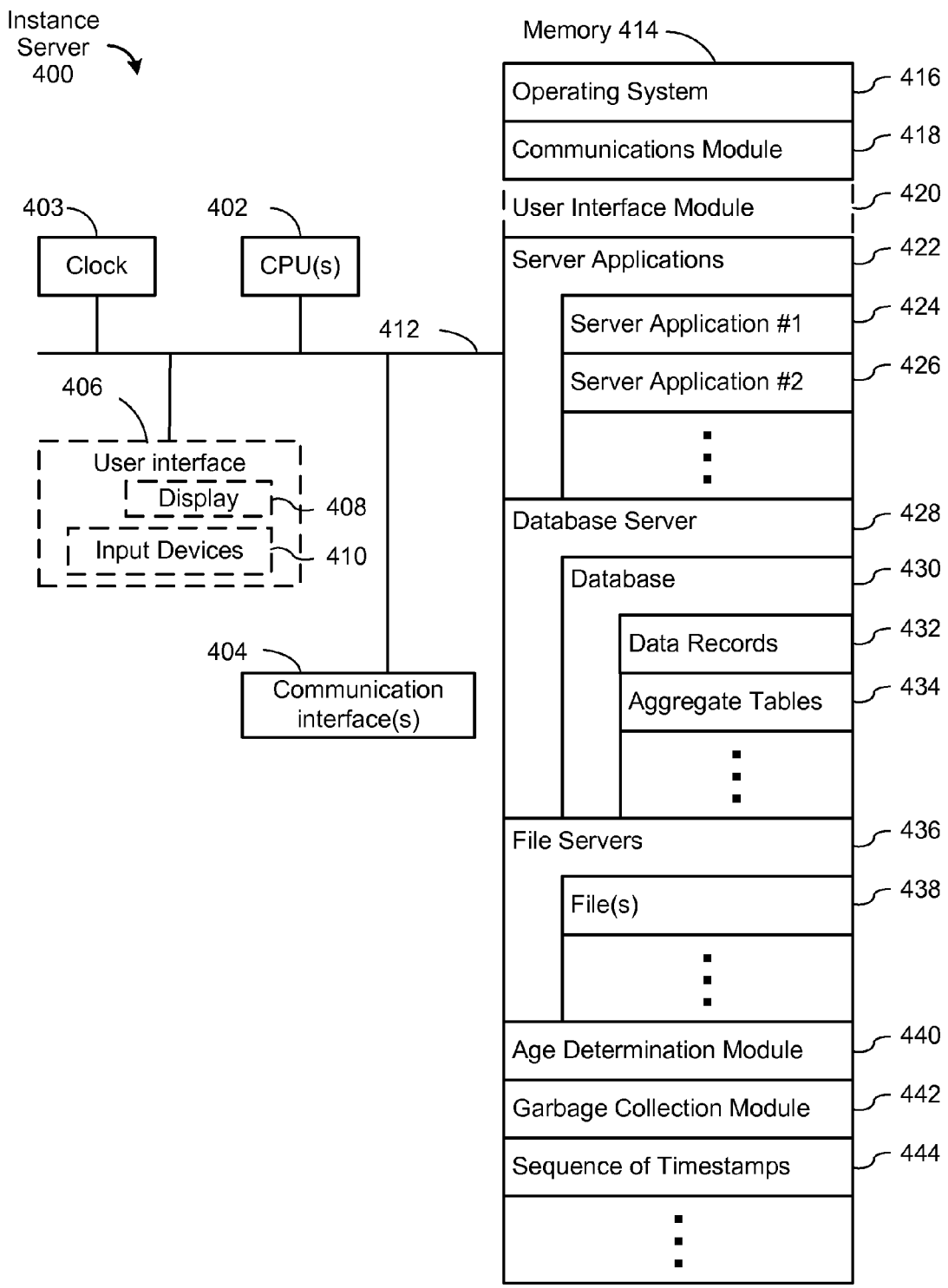
FIG. 4 is a block diagram of an instance server that may be used for the various programs and processes, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some embodiments, the clock 403 is a local clock that is periodically synchronized with a clock server (e.g., a quorum clock server 228 or any other clock server on a network, etc.). In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- an optional user interface module 420 that receives commands from the user via the input devices 410 and generates user interface objects in the display device 408;
- one or more server applications 422, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 424 and 426 may execute on the same physical computer;
- one or more database servers 428 that provides storage and access to one or more databases 430. The databases 430 may provide storage for metadata 206, replication queues 226, blob policies 326, global configuration 312, the statistics used by statistics server 324, as well as ancillary databases used by any of the other functionality. Each database 430 has one or more tables with data records 432. In some embodiments, some databases include aggregate tables 434, such as the statistics used by statistics server 324;
- one or more file servers 436 that provide access to read and write files, such as files 438. File server functionality may be provided directly by an operating system (e.g., UNIX or Linux), or by a software application, such as the Google File System (GFS);
- an age determination module 440 that determines an age of an object (or a time interval between two timestamps) in the presence of unreliable clocks, as described herein;
- a garbage collection module 442 that performs garbage collection operations based on garbage collection policies, as described herein; and
- a sequence of timestamps 444 generated by the age determination module 440, as described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512) as tape masters. In some embodiments, each instance has about 10 instance servers performing (514) replication management, which includes both dynamic and background replication. In some embodiments, each instance has about 5 instance servers performing (516) as quorum clock servers.

Determining An Age of an Object

The embodiments described herein for determining an age of an object in the presence of unreliable clocks is described with respect to FIGS. 6-13 below.

Figure 9:
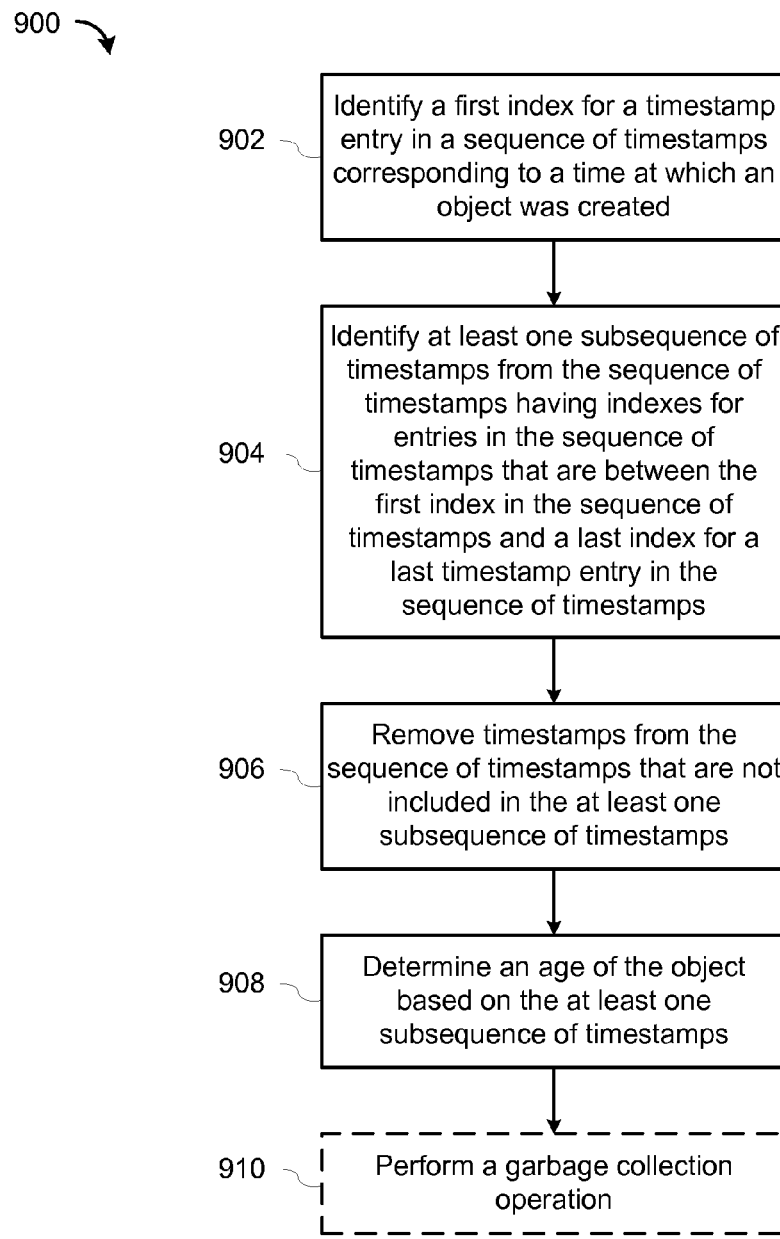
FIG. 9 is a flowchart of a method for determining an age of an object, according to some embodiments.

FIG. 9 is a flowchart of a method 900 for determining an age of an object, according to some embodiments. The age determination module 440 identifies (902) a first index for a timestamp entry in a sequence of timestamps corresponding to a time at which an object was created. In some embodiments, the sequence of timestamps is generated by periodically storing a current timestamp reported by a clock of an instance server into the sequence of timestamps.

Figure 6:
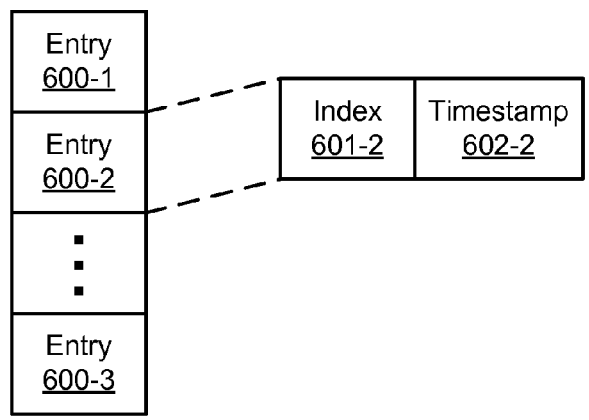
FIG. 6 is a block diagram illustrating an exemplary data structure for storing a sequence of timestamps, according to some embodiments.

Attention is now directed to FIG. 6, which is a block diagram illustrating an exemplary data structure for storing a sequence of timestamps 444, according to some embodiments. The sequence of timestamps 444 includes entries 600. Each entry 600 includes an index 601 and a timestamp 602. In some embodiments, the indexes 601 are monotonically increasing integers. The age determination module 440 stores successive current timestamps in into the timestamp field 602 of a new entry 600 of the sequence of timestamps 444. For example, if the age determination module 440 stores a current timestamp every day, the age determination module 440 creates a new entry 600 each day, stores the next value for the index into the index 601 field of the new entry 600, and stores the current timestamp into the timestamp 602 field of the new entry 600.

FIG. 13A is a block diagram illustrating an exemplary sequence of timestamps 1300 recorded by the age determination module 440, according to some embodiments. The sequence of timestamps 1300 includes indexes 1302 and timestamps 1304. In this example, the creation of an object corresponds to index 3 having a timestamp of 3 and the current time corresponds to index 13 having the timestamp 101. Note that both the creation time of the object and the current timestamp (i.e., the last timestamp in the sequence of timestamps) are represented by entries in the sequence of timestamps. Accordingly, the actual creation time of the object and the actual current time are accurate only to the time interval between successive storages of the current timestamp (e.g., one day, etc.). Also note that for the sake of clarity, the timestamps used in FIGS. 13A-13C are integers. However, any timestamp format may be used.

Figure 7:
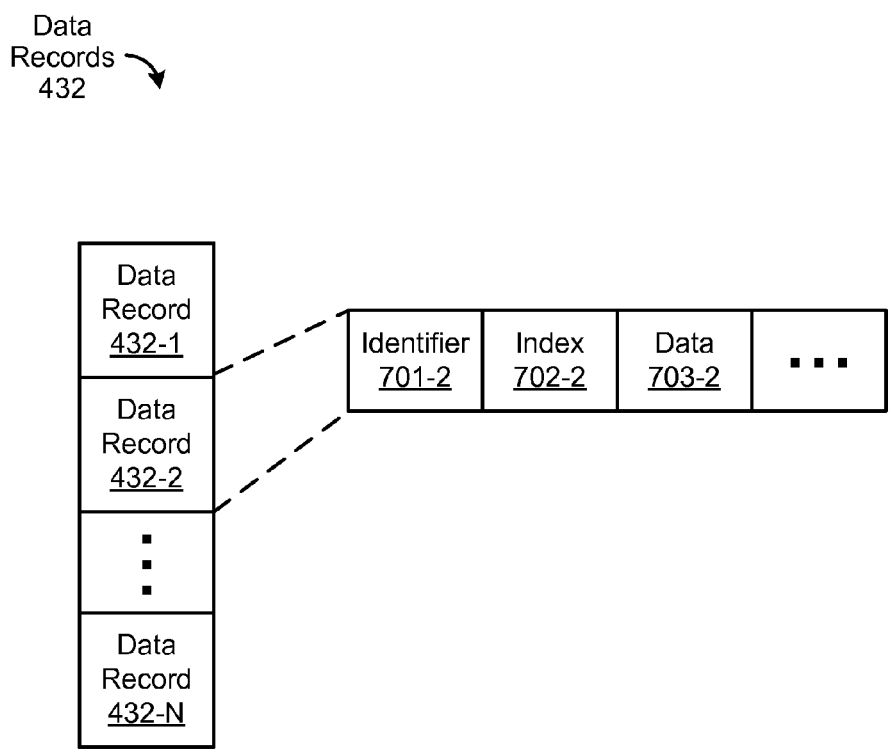
FIG. 7 is a block diagram illustrating an exemplary data structure for data records, according to some embodiments.
Figure 8:
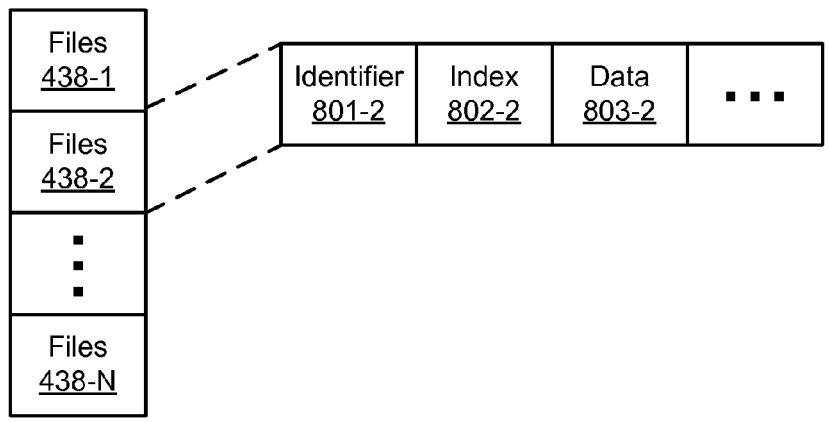
FIG. 8 is a block diagram illustrating an exemplary data structure for files, according to some embodiments.

As discussed above, the creation time of objects is represented by an index of the sequence of timestamps. The data structures for objects using the embodiments described herein are illustrated in FIGS. 7 and 8. FIG. 7 is a block diagram illustrating an exemplary data structure for data records 432, according to some embodiments. The data records 432 include an identifier 701, an index 702 corresponding to the index in the sequence of timestamps 444 (or the sequence of timestamps 1300), and data 703. The index 702 therefore represents the creation time of the data record 432. Note that this data structure is merely used to illustrate that a creation timestamp for a data record 432 is represented by the index 702. Other data structures may be used for the data records 432. Similarly, FIG. 8 is a block diagram illustrating an exemplary data structure for files 438, according to some embodiments. The files 438 include an identifier 801, an index 802 corresponding to the index in the sequence of timestamps 444 (or the sequence of timestamps 1300), and data 803. The index 802 therefore represents the creation time of the file 438. Note that this data structure is merely used to illustrate that a creation timestamp for a file 438 is represented by the index 802. Other data structures may be used for the files 438.

Returning to FIG. 9, the age determination module 440 identifies (904) at least one subsequence of timestamps from the sequence of timestamps having indexes for entries in the sequence of timestamps that are between the first index in the sequence of timestamps and a last index for a last timestamp entry in the sequence of timestamps, wherein the at least one subsequence of timestamps conforms to a function of a time interval between storage of consecutive current timestamps reported by clock of the computer system.

Figure 10:
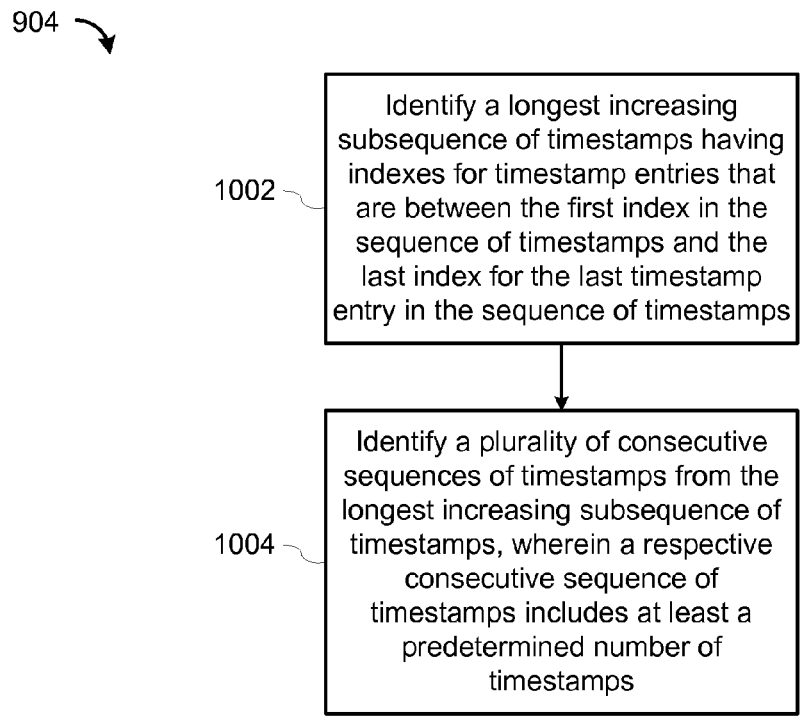
FIG. 10 is a flowchart of a method for identifying a subsequence of timestamps, according to some embodiments.

Attention is now directed to FIG. 10, which is a flowchart of a method for identifying (904) at least one subsequence of timestamps, according to some embodiments. The age determination module 440 identifies (1002) a longest increasing subsequence of timestamps having indexes for timestamp entries that are between the first index (e.g., index 3 in FIG. 13A) in the sequence of timestamps and the last index for the last timestamp entry (e.g., index 13 in FIG. 13A) in the sequence of timestamps. For example, continuing the example presented in FIG. 13A, the longest increasing subsequence of timestamps is illustrated in FIG. 13B, which is a block diagram 1310 illustrating an exemplary longest increasing subsequence of timestamps in the sequence of timestamps, according to some embodiments. In this example, the longest increasing subsequence includes indexes {3, 4, 5, 7, 8, 10, 11, 12, 13} corresponding to the timestamps {3, 5, 7, 9, 11, 12, 14, 100, 101}.

The age determination module 440 then identifies (1004) a plurality of consecutive sequences of timestamps from the longest increasing subsequence of timestamps, wherein a respective consecutive sequence of timestamps includes at least a predetermined number of timestamps, and wherein the time interval between consecutive timestamps in the respective consecutive sequence of timestamps is less than a predetermined factor of the time interval between storage of consecutive current timestamps reported by the clock of the computer system. For example, consider the exemplary case where the predetermined number of timestamps in a respective consecutive sequence of timestamps is 3 and the time interval between consecutive timestamps in the respective consecutive timestamps is 2. This exemplary case is illustrated in FIG. 13C, is a block diagram 1320 illustrating exemplary subsequences of timestamps in the sequence of timestamps selected from the exemplary longest increasing subsequence of timestamps, according to some embodiments. As illustrated in FIG. 13C, applying these constraints, the consecutive sequences of timestamps has the indexes {3, 4, 5, 7, 8, 10, 11} corresponding to the timestamps {3, 5, 7, 9, 11, 12, 14}. Note that there is only one consecutive sequence of timestamps in this case because there are at least 3 timestamps in the consecutive sequence of timestamps and the time interval between consecutive timestamps is less than or equal to 2.

Returning to FIG. 9, the age determination module 440 removes (906) timestamps from the sequence of timestamps that are not included in the at least one subsequence of timestamps. For example, FIGS. 13B and 13C illustrate the timestamps that have been removed (e.g., marked with an "X"). Note that timestamps are not removed from the sequence of timestamps 444. Instead, the timestamps are only removed from the determination of the age of the object.

Figure 11:
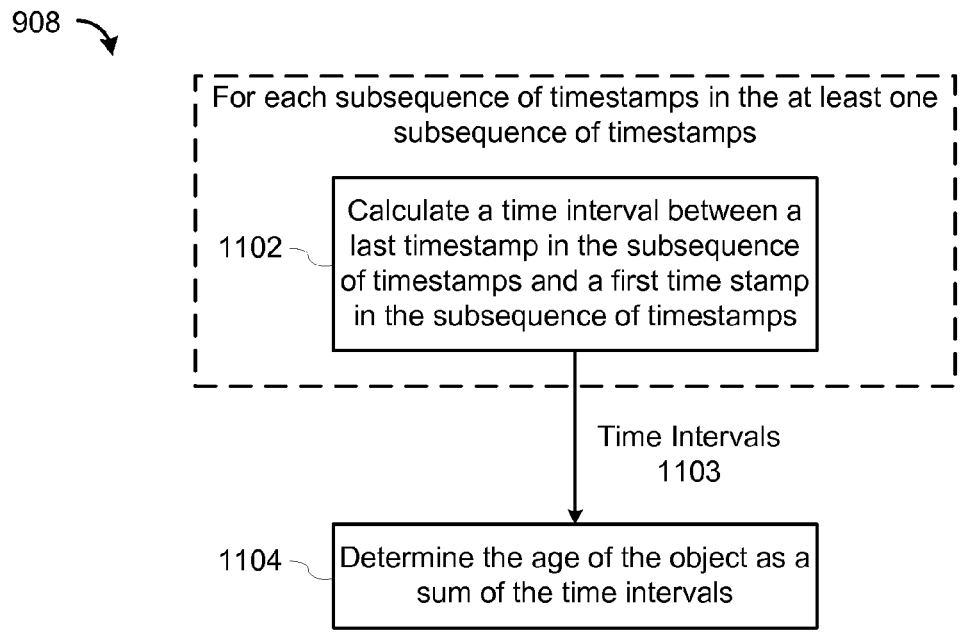
FIG. 11 is a flowchart of a method for determining an age of an object based on the subsequence of timestamps, according to some embodiments.

The age determination module 440 then determines (908) an age of the object based on the at least one subsequence of timestamps. FIG. 11 is a flowchart of a method for determining (908) an age of an object based on the subsequence of timestamps, according to some embodiments. For each subsequence of timestamps in the at least one subsequence of timestamps, the age determination module 440 calculates (1102) a time interval between a last timestamp in the subsequence of timestamps and a first time stamp in the subsequence of timestamps. The age determination module 440 then determines (1104) the age of the object as a sum of the time intervals. For the example presented in FIG. 13C, there is only one subsequence of timestamps. Thus, the age of the object is determined to be 14−3=11. Where there is more than one subsequence of timestamps, the difference between the first and last timestamps in each subsequence is summed to determine the age of the object. For example, if the subsequences of timestamps are {1, 2, 3}, {11, 12, 14}, and {101, 103, 104}, the age of the object is (3−1)+(14−11)+(104−101)=8.

Figure 12:
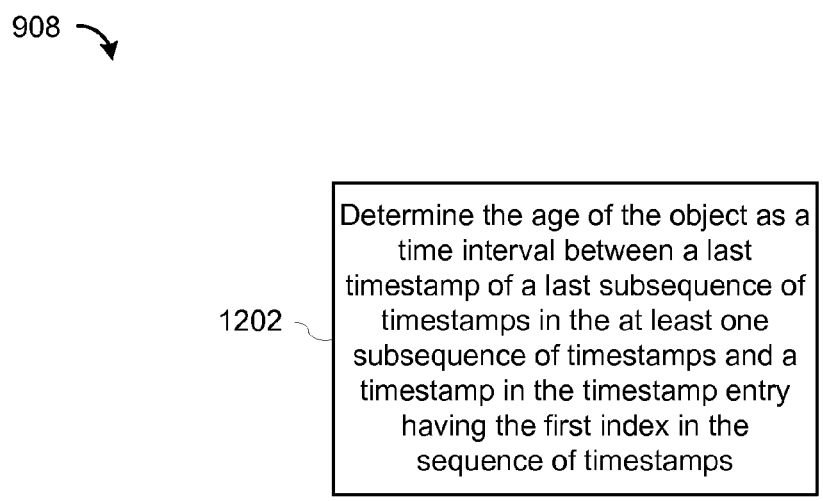
FIG. 12 is a flowchart of a method for determining an age of an object based on the subsequence of timestamps, according to some embodiments.

FIG. 12 is a flowchart of an alternative method for determining (908) an age of an object based on the subsequence of timestamps, according to some embodiments. The age determination module 440 determines (1202) the age of the object as a time interval between a last timestamp of a last subsequence of timestamps in the at least one subsequence of timestamps and a timestamp in the timestamp entry having the first index in the sequence of timestamps. Since the example presented in FIG. 13C has only one subsequence of timestamps, the age of the object is also 14−3=11. Note that these embodiments may be used in cases where the minimum length of the subsequence is sufficiently long enough so that at least one reliable timestamp is recorded in the subsequence of timestamps. Consider the example from above where the subsequences of timestamps do not include a reliable timestamp: {1, 2, 3}, {11, 12, 14}, and {101, 103, 104}. In this case, the age of the object is incorrectly determined as (104−1)=103. However, consider the following sequence of timestamps in which a reliable timestamp is recorded in the 6th and 12th elements (i.e., a timestamp of 6 and 12): {1, 2, 3, 7, 8, 6, 7, 8, 9, 3, 2, 12, 13, 14}. Even though the sequence of timestamps includes unreliable timestamps, the longest subsequence of timestamps is: {1, 2, 3, 6, 7, 8, 9, 12, 13, 14}. Applying the constraints that the predetermined number of timestamps in a respective consecutive sequence of timestamps is 3 and the time interval between consecutive timestamps in the respective consecutive timestamps is 2, the subsequences of timestamps are {1, 2, 3}, {6, 7, 8, 9}, {12, 13, 14}. Assuming that an object is created at timestamp 1, the age of the object is correctly determined as 14−1=13.

Returning to FIG. 9, in some embodiments, the garbage collection module 442 performs a garbage collection operation based on the age of the object. Note that the garbage collection operation may be the removal of the object from the distributed storage system 200.

In some embodiments, the garbage collection module 442 performs a garbage collection operation if the age of the object is greater than a predetermined threshold (e.g., one week).

In some embodiments, the garbage collection module 442 performs a garbage collection operation if the age of the object is greater than a predetermined threshold and if metadata is not associated with the object. Note that metadata for an object may not exist if the object was created in the instance but the blobmaster 204 did not update the metadata store 206 with the information for the object. Objects that do not have associated metadata are referred to as "orphan objects."

In some embodiments, the garbage collection module 442 performs a garbage collection operation if the age of the object is greater than a predetermined threshold and if the object has not been accessed within a predetermined time period. In some embodiments, the garbage collection operation is performed subject to replication policies of the object.

The methods 900, 904, and 908 may be governed by instructions that are stored in a computer readable storage medium and that are executed by one or more processors of one or more servers. Each of the operations shown in FIGS. 9-12 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for determining an age of an object, comprising:
at a computer system including one or more processors and memory storing one or more programs for execution by the one or more processors:
identifying a first index for a timestamp entry in a sequence of timestamps corresponding to a time at which an object was created, wherein the sequence of timestamps is generated by periodically storing a current timestamp reported by a clock of the computer system into the sequence of timestamps;
identifying at least one subsequence of timestamps from the sequence of timestamps having indexes for entries in the sequence of timestamps that are between the first index in the sequence of timestamps and a last index for a last timestamp entry in the sequence of timestamps, wherein the at least one subsequence of timestamps conforms to a function of a time interval between storage of consecutive current timestamps reported by clock of the computer system, wherein identifying the at least one subsequence of timestamps from the sequence of timestamps includes:
identifying a longest increasing subsequence of timestamps having indexes for timestamp entries that are between the first index in the sequence of timestamps and the last index for the last timestamp entry in the sequence of timestamps; and
identifying a plurality of consecutive sequences of timestamps from the longest increasing subsequence of timestamps, wherein a respective consecutive sequence of timestamps includes at least a predetermined number of timestamps, and wherein the time interval between consecutive timestamps in the respective consecutive sequence of timestamps is less than a predetermined factor of the time interval between storage of consecutive current timestamps reported by the clock of the computer system; and
determining an age of the object based on the at least one subsequence of timestamps.

2. The method of claim 1, wherein determining the age of the object based on the at least one subsequence of timestamps includes:
for each subsequence of timestamps in the at least one subsequence of timestamps, calculating a time interval between a last timestamp in the subsequence of timestamps and a first time stamp in the subsequence of timestamps; and
determining the age of the object as a sum of the time intervals.

3. The method of claim 1, wherein determining the age of the object based on the at least one subsequence of timestamps includes determining the age of the object as a time interval between a last timestamp of a last subsequence of timestamps in the at least one subsequence of timestamps and a timestamp in the timestamp entry having the first index in the sequence of timestamps.

4. The method of claim 1, further comprising performing a garbage collection operation if the age of the object is greater than a predetermined threshold.

5. The method of claim 1, further comprising performing a garbage collection operation if the age of the object is greater than a predetermined threshold and if metadata is not associated with the object.

6. The method of claim 1, further comprising performing a garbage collection operation if the age of the object is greater than a predetermined threshold and if the object has not been accessed within a predetermined time period.

7. The method of claim 1, wherein the object is stored in a distributed storage system.

8. The method of claim 1, further comprising:
removing timestamps from the sequence of timestamps that are not included in the at least one subsequence of timestamps.

9. The method of claim 1, wherein clock of the computer system is an unreliable clock.

10. A system for determining an age of an object, comprising:
one or more processors;
memory; and
one or more programs stored in the memory, the one or more programs comprising instructions to:
identify a first index for a timestamp entry in a sequence of timestamps corresponding to a time at which an object was created, wherein the sequence of timestamps is generated by periodically storing a current timestamp reported by a clock of the computer system into the sequence of timestamps;
identify at least one subsequence of timestamps from the sequence of timestamps having indexes for entries in the sequence of timestamps that are between the first index in the sequence of timestamps and a last index for a last timestamp entry in the sequence of timestamps, wherein the at least one subsequence of timestamps conforms to a function of a time interval between storage of consecutive current timestamps reported by clock of the computer system, wherein the instructions to identify the at least one subsequence of timestamps from the sequence of timestamps include instructions to:
identify a longest increasing subsequence of timestamps having indexes for timestamp entries that are between the first index in the sequence of timestamps and the last index for the last timestamp entry in the sequence of timestamps; and
identify a plurality of consecutive sequences of timestamps from the longest increasing subsequence of timestamps, wherein a respective consecutive sequence of timestamps includes at least a predetermined number of timestamps, and wherein the time interval between consecutive timestamps in the respective consecutive sequence of timestamps is less than a predetermined factor of the time interval between storage of consecutive current timestamps reported by the clock of the computer system; and
determine an age of the object based on the at least one subsequence of timestamps.

11. The system of claim 10, wherein the instructions to determine the age of the object based on the at least one subsequence of timestamps include instructions to:
for each subsequence of timestamps in the at least one subsequence of timestamps, calculate a time interval between a last timestamp in the subsequence of timestamps and a first time stamp in the subsequence of timestamps; and
determine the age of the object as a sum of the time intervals.

12. The system of claim 10, wherein the instructions to determine the age of the object based on the at least one subsequence of timestamps include instructions to determine the age of the object as a time interval between a last timestamp of a last subsequence of timestamps in the at least one subsequence of timestamps and a timestamp in the timestamp entry having the first index in the sequence of timestamps.

13. The system of claim 10, further comprising instructions to perform a garbage collection operation if the age of the object is greater than a predetermined threshold.

14. The system of claim 10, further comprising instructions to perform a garbage collection operation if the age of the object is greater than a predetermined threshold and if metadata is not associated with the object.

15. The system of claim 10, further comprising instructions to perform a garbage collection operation if the age of the object is greater than a predetermined threshold and if the object has not been accessed within a predetermined time period.

16. The system of claim 10, wherein the object is stored in a distributed storage system.

17. The system of claim 10, further comprising instructions to remove timestamps from the sequence of timestamps that are not included in the at least one subsequence of timestamp.

18. The system of claim 10, wherein clock of the computer system is an unreliable clock.

19. A non-transitory computer readable storage medium storing one or more programs configured for execution by a computer, the one or more programs comprising instructions to:
identify a first index for a timestamp entry in a sequence of timestamps corresponding to a time at which an object was created, wherein the sequence of timestamps is generated by periodically storing a current timestamp reported by a clock of the computer system into the sequence of timestamps;
identify at least one subsequence of timestamps from the sequence of timestamps having indexes for entries in the sequence of timestamps that are between the first index in the sequence of timestamps and a last index for a last timestamp entry in the sequence of timestamps, wherein the at least one subsequence of timestamps conforms to a function of a time interval between storage of consecutive current timestamps reported by clock of the computer system, wherein the instructions to identify the at least one subsequence of timestamps from the sequence of timestamps include instructions to:
identify a longest increasing subsequence of timestamps having indexes for timestamp entries that are between the first index in the sequence of timestamps and the last index for the last timestamp entry in the sequence of timestamps; and
identify a plurality of consecutive sequences of timestamps from the longest increasing subsequence of timestamps, wherein a respective consecutive sequence of timestamps includes at least a predetermined number of timestamps, and wherein the time interval between consecutive timestamps in the respective consecutive sequence of timestamps is less than a predetermined factor of the time interval between storage of consecutive current timestamps reported by the clock of the computer system; and
determine an age of the object based on the at least one subsequence of timestamps.

20. The computer readable storage medium of claim 19, wherein the instructions to determine the age of the object based on the at least one subsequence of timestamps include instructions to:
for each subsequence of timestamps in the at least one subsequence of timestamps, calculate a time interval between a last timestamp in the subsequence of timestamps and a first time stamp in the subsequence of timestamps; and determine the age of the object as a sum of the time intervals.

21. The computer readable storage medium of claim 19, wherein the instructions to determine the age of the object based on the at least one subsequence of timestamps include instructions to determine the age of the object as a time interval between a last timestamp of a last subsequence of timestamps in the at least one subsequence of timestamps and a timestamp in the timestamp entry having the first index in the sequence of timestamps.

22. The computer readable storage medium of claim 19, further comprising instructions to perform a garbage collection operation if the age of the object is greater than a predetermined threshold.

23. The computer readable storage medium of claim 19, further comprising instructions to perform a garbage collection operation if the age of the object is greater than a predetermined threshold and if metadata is not associated with the object.

24. The computer readable storage medium of claim 19, further comprising instructions to perform a garbage collection operation if the age of the object is greater than a predetermined threshold and if the object has not been accessed within a predetermined time period.

25. The computer readable storage medium of claim 19, wherein the object is stored in a distributed storage system.

26. The computer readable storage medium of claim 19, further comprising instructions to remove timestamps from the sequence of timestamps that are not included in the at least one subsequence of timestamp.

27. The computer readable storage medium of claim 19, wherein clock of the computer system is an unreliable clock.

* * * * *